(12) United States Patent
Edlinger

(10) Patent No.: US 6,347,775 B1
(45) Date of Patent: Feb. 19, 2002

(54) SECURING HOOK FOR A WINDOW SHADE

(75) Inventor: Andreas Edlinger, Garching (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 09/644,709

(22) Filed: Aug. 24, 2000

(30) Foreign Application Priority Data

Aug. 24, 1999 (DE) .......................... 199 40 028

(51) Int. Cl.$^7$ ................................................ A47H 1/10
(52) U.S. Cl. ................ 248/266; 160/370.22; 296/146.2
(58) Field of Search ........................... 248/266, 200, 248/694; 296/146.2, 146.16; 160/370.22, 290.1

(56) References Cited

U.S. PATENT DOCUMENTS 6,076,886 A * 6/2000 Petri et al. ............. 296/216.09
6,186,586 B1 * 2/2001 Lindinger .................. 296/214

FOREIGN PATENT DOCUMENTS

WO    WO 98/02631    * 1/1998

OTHER PUBLICATIONS

US 2001/10350 A1; Cattaneo.*

* cited by examiner

Primary Examiner—Ramon O. Ramirez
(74) Attorney, Agent, or Firm—Crowell & Moring LLP

(57) ABSTRACT

On the edge of an opening for a motor-driven window glass of a vehicle, a hook is arranged on which the free end of a window shade can be latched. In order to activate a pinch protection, even in the most unfavorable case, a slide is provided which can be moved within limits in movement direction of the window glass and which triggers the pinch protection upon a movement to the edge of the window opening.

14 Claims, 2 Drawing Sheets

SECURING HOOK FOR A WINDOW SHADE

BACKGROUND AND SUMMARY OF THE INVENTION

This application claims the priority of German Patent Document 199 40 028.8, filed in Germany on Aug. 24, 1999, the disclosure of which is expressly incorporated by reference herein.

The invention concerns a hook arranged on the edge of the opening for a motor-driven window glass of an automobile on which a free end of a window shade can be latched.

In order to reduce the risk of injury, it is common to provide in motor-driven windows of automobiles pinch protection on the edge of the window opening against which the window glass moves at the end of its closing movement.

It is further known to provide vehicle window glasses with shades which primarily provide relief from excessive sun radiation. In such case, the shade can be rolled up by a spring-loaded roller and is in many cases hung by its free edge on a hook which is provided at the associated edge of the window opening. In such case it can occur that the pinch protection does not become fully effective if for example a body part is situated between the edge of the glass and the hook.

An object of the invention is to ensure an effective protection even in this situation.

This object is achieved with a hook of the above construction including a slide which can be moved within limits in the direction of movement of a window glass and which triggers a pinch protection mechanism upon being slid to the edge of the window opening.

If a force is exerted on the slide in the direction of the closing movement of the window glass, it can move with limitation in the same direction and in the process activate the pinch protection even if the edge of the glass itself is still adequately far from the pinch protection. Any risk of injury is thereby avoided.

Other objects, advantages and novel features of the present invention will become apparent from the following detailed description of the invention when considered in conjunction with the accompanying drawings.

BRIEF DESCRIPTION OF THE DRAWINGS

The invention is explained in greater detail below with the aid of several exemplary embodiments depicted in the drawings.

DETAILED DESCRIPTION OF THE DRAWINGS

Figure 1:
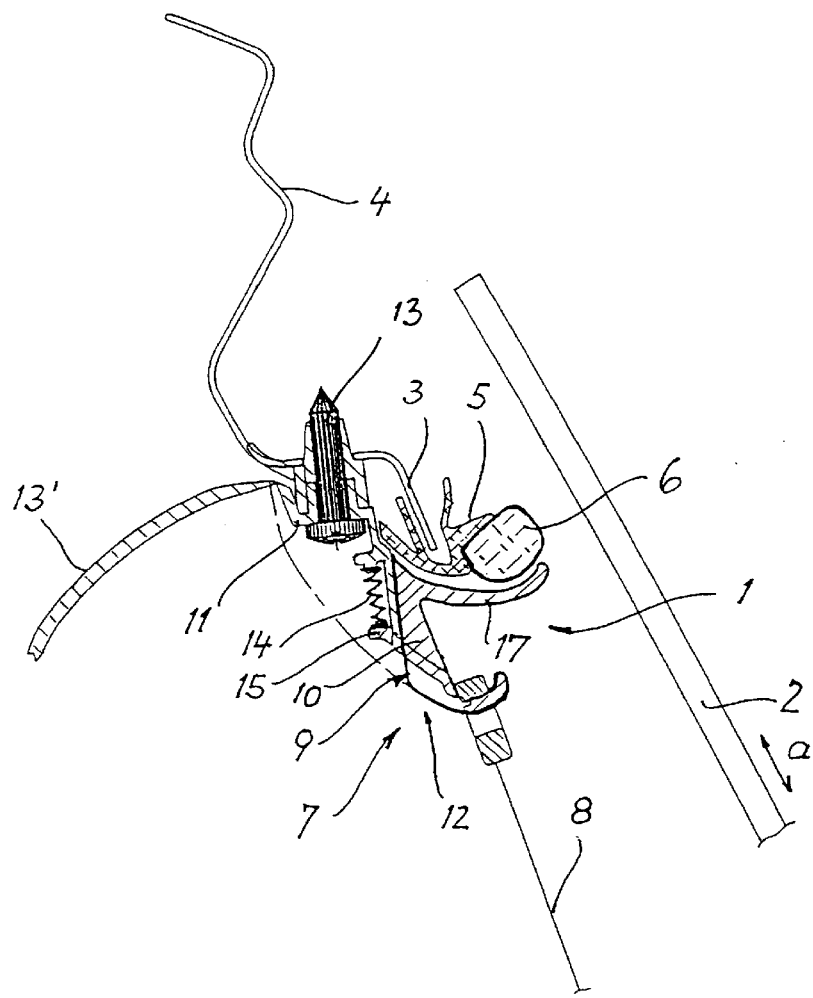
FIG. 1 shows a vertical section in the area of the upper edge of a window opening for a window glass which can be moved vertically.

In FIG. 1, the upper edge 1 of a window opening is shown as well as a window glass 2 which can be moved by a motor from below to above. On a downward-directed flange 3 of a skirt 4 of the window frame, an elastic cover 5 is placed on which a pinch protection 6 is also mounted.

On hook 7, a slide 9 is provided which is movable within limits in the movement direction a of window glass 2 and which activates pinch protection 6 upon being slid to edge 1.

In the exemplary embodiment according to FIG. 1, slide 9 is a hook section 10 which can be moved in a straight line with respect to a base part 11 fixed to the vehicle body. It would also be conceivable by way of example to arrange a hook section so as to pivot on a base part in order to activate the pinch protection 6 upon the exertion of force against the hook section from below.

In the exemplary embodiment according to FIG. 1, hook section 10 can be moved by means of a suitable slide channel 12 across from base part 11. Base part 11, which can be fastened to the sheet metal with a fastening screw 13, further has a latchable covering flap 13' which following the fastening of the base part is pivoted from the position depicted to the position indicated by the dashed lines and latched there. Hook section 10 can be moved upward to a limited extent against the effect of a spring 14 which rests on one side on base part 11 and on the other side on a corresponding projection 15 of hook section 10.

Figure 2:
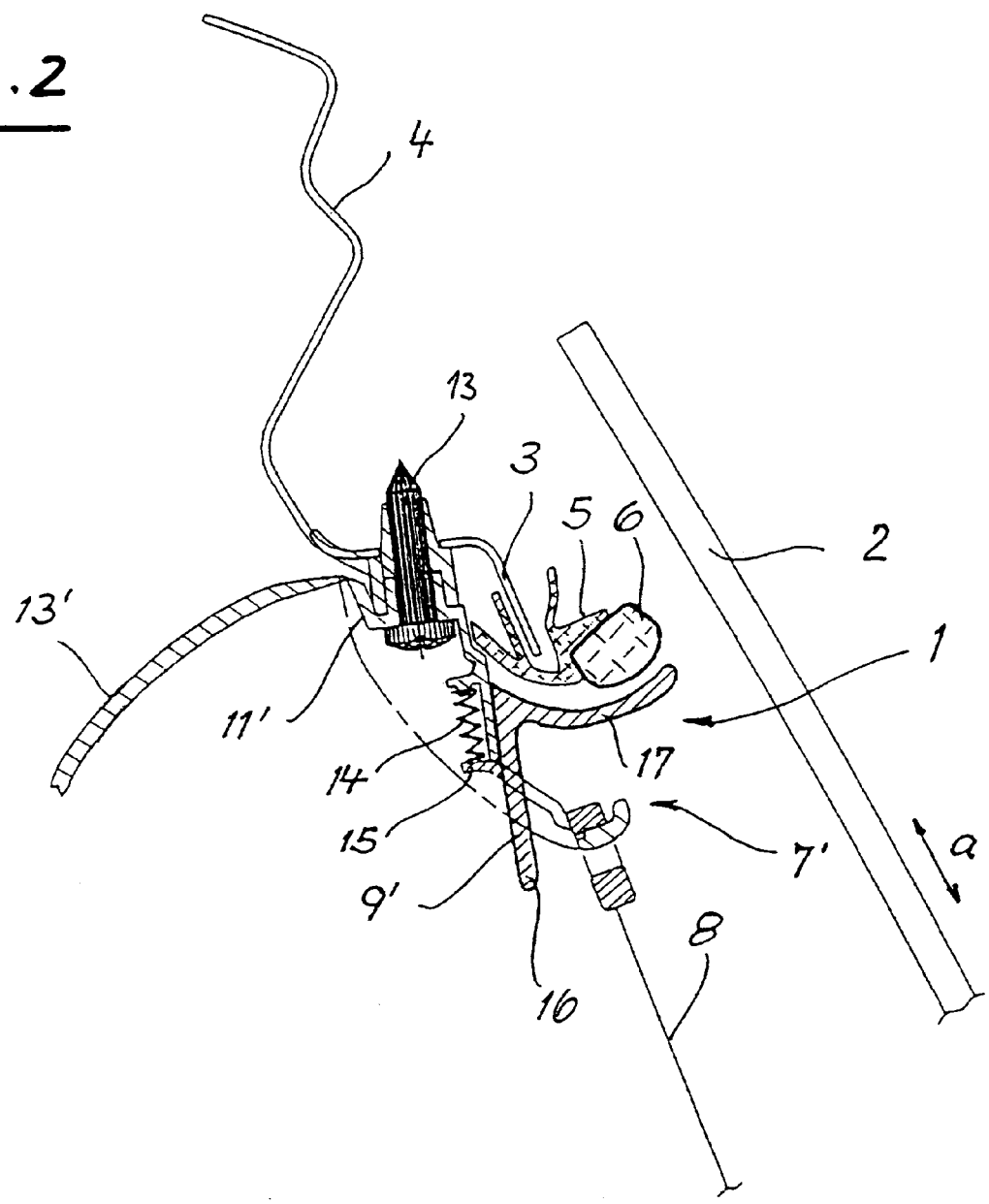
FIG. 2 shows a section corresponding to that of FIG. 1 of a modified embodiment.

In the exemplary embodiment according to FIG. 2, hook 7' proper is configured of a single piece and a slide 9' can be moved upward against the effect of spring 14 far enough that in the highest position it can activate pinch protection 6. To this end, a lower end 16 of slide 9' is configured such that in a rest position it projects across the lower end of hook 7'. If there is a risk of pinching between the upper edge of window glass 2 and the lower end of hook 7', slide 9' will first be moved upward above its lower end 16 and will activate pinch protection 6.

Figure 3:
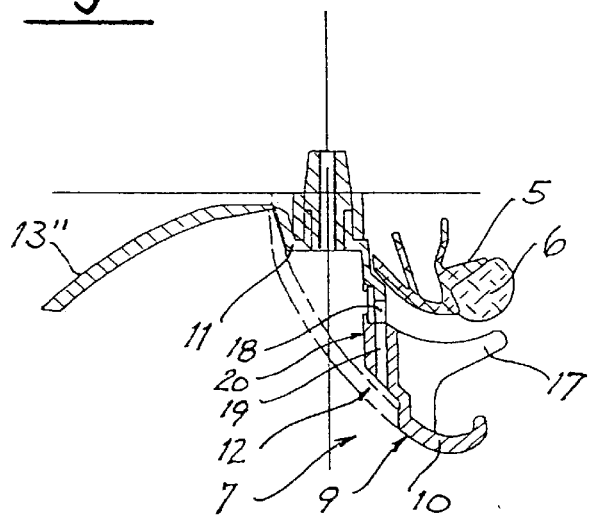
FIG. 3 shows another modified partial section corresponding to FIG. 1 of an additional embodiment.
Figure 4:
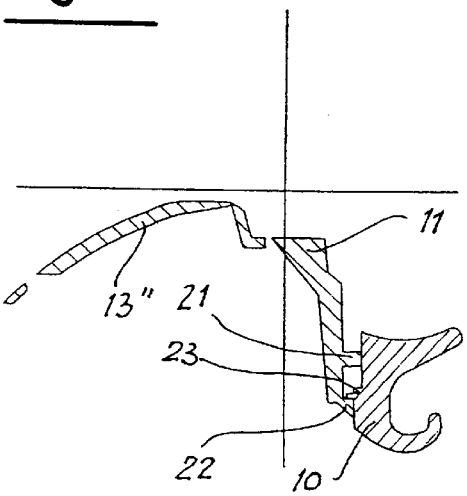
FIG. 4 shows a section of the hook according to FIG. 3 parallel to the section of FIG. 3.

In the two exemplary embodiments according to FIGS. 1 and 2, the activation of pinch protection 6 is accomplished through at least one, preferably two laterally projecting arms 17 which can act upon pinch protection 6. In FIGS. 3 and 4, a hook is depicted which corresponds somewhat to that of the exemplary embodiment according to FIG. 1, but is an embodiment form which is somewhat closer to series production. A channel slot 18 formed in the base part 11 can be seen which is penetrated by the web 19 of a T-shaped guide rail 20 of hook section 10.

Finally discernable in FIG. 4, which depicts a section somewhat offset laterally with respect to the middle of the hook, are also stops 21 and 22 of the base part which interacting with a projection 23 of hook section 10 limit the path of movement of hook section 10.

What is claimed is:

1. Hooks arranged at the edge of the opening for a vehicle motor-driven window glass, on which a free end of a window shade is latchable, comprising a device which is configured to act as pinch protection and is mounted at the edge of the window glass opening, and a slide movable within defined limits in a direction of movement of the window glass to trigger the pinch protection upon being slid to the edge.

2. Hook according to claim 1, wherein the slide is a hook section movable in a straight line with respect to a base part fastened to a vehicle body.

3. Hook according to claim 2, wherein the hook section is slidable on a slide track across from the base part.

4. Hook according to claim 3, wherein a guide slot is provided in a base part which is penetrated by a web of a T-shaped guide strip of the hook section.

5. Hook according to claim 1, wherein a lower end of the slide in rest position projects above a lower end of the hook.

6. Hook according to claim 1, wherein the slide is movable to the edge against force of a spring.

7. Hook according to claim 1, wherein the slide has at least one arm which projects laterally and which is configured to come into contact with the pinch protection.

8. A hook and pinch protector arrangement for use at an edge of a window opening for a motor-driven window glass of a vehicle comprising:
   a base part;
   a pinch protector operatively connected to the base part and mountable at the edge of the window opening; and
   a hook operatively connected to the base part and including a slide capable of triggering the pinch protector and movable a pre-set distance in a direction of movement of the window glass;
   wherein the slide is movable-to trigger the pinch protector upon being slid to the edge of the window glass opening.

9. The hook and pinch protector arrangement of claim 8, wherein the base part is fastenable to the vehicle and the slide includes a hook section which is movable in a straight line with respect to the base part.

10. The hook and pinch protector arrangement of claim 9, wherein a slide track is formed on the base part on which the hook section slides.

11. The hook and pinch protector arrangement of claim 10, wherein a guide slot is formed in the base part and is penetrated by a web of a T-shaped guide strip of the hook section.

12. The hook and pinch protector arrangement of claim 8, wherein in a rest position, a lower end of the slide projects above a lower end of the hook.

13. The hook and pinch protector arrangement of claim 8, wherein the slide is moved against a force of a spring when the slide is moved in a direction toward the edge of the window opening.

14. The hook and protector arrangement of claim 8, wherein the slide includes at least one arm which projects laterally from the slide and which is capable of coming into contact with the pinch protector.

\* \* \* \* \*